US010543842B2

(12) United States Patent
Pursifull et al.

(10) Patent No.: US 10,543,842 B2
(45) Date of Patent: Jan. 28, 2020

(54) SYSTEM AND METHOD FOR GENERATING VACUUM VIA AN ENGINE

(71) Applicant: Ford Global Technologies, LLC, Dearborn, MI (US)

(72) Inventors: Ross Dykstra Pursifull, Dearborn, MI (US); Russ William Ferguson, Ypsilanti, MI (US); Ralph Wayne Cunningham, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 113 days.

(21) Appl. No.: 15/946,174

(22) Filed: Apr. 5, 2018

(65) Prior Publication Data
US 2018/0222485 A1 Aug. 9, 2018

Related U.S. Application Data

(62) Division of application No. 14/559,042, filed on Dec. 3, 2014, now Pat. No. 10,005,463.

(51) Int. Cl.
B60W 10/11 (2012.01)
B60W 30/18 (2012.01)
B60T 13/52 (2006.01)
F16H 59/54 (2006.01)
F16H 61/16 (2006.01)
(Continued)

(52) U.S. Cl.
CPC ....... B60W 30/18109 (2013.01); B60T 13/52 (2013.01); F02D 41/08 (2013.01); F16H 59/54 (2013.01); F16H 61/00 (2013.01); F16H 61/16 (2013.01); B60Y 2200/92 (2013.01); F02D 41/0225 (2013.01); F02D 2200/502 (2013.01); F02D 2200/602 (2013.01); F02M 35/10229 (2013.01); F16H 2061/168 (2013.01); F16H 2061/207 (2013.01); F16H 2300/18 (2013.01)

(58) Field of Classification Search
None
See application file for complete search history.

(56) References Cited

U.S. PATENT DOCUMENTS 2,077,578 A 4/1937 Neracher
2,224,747 A 12/1940 Sacks et al.
(Continued)

FOREIGN PATENT DOCUMENTS

CN 101039828 A 9/2007
CN 102089197 A 6/2011
(Continued)

OTHER PUBLICATIONS

State Intellectual Property Office of the People's Republic of China, Office Action and Search Report Issued in Application No. 201510873327.4, dated Mar. 15, 2019, 11 pages. (Submitted with Partial Translation).

Primary Examiner — Dirk Wright
(74) Attorney, Agent, or Firm — Geoffrey Brumbaugh; McCoy Russell LLP

(57) ABSTRACT

Methods and systems for improving vacuum generation for an engine that may be operated at higher altitudes are presented. In one non-limiting example, a transmission that is mechanically coupled to the engine may be shifted from a gear to neutral in response to an actual total number of times a vehicle brake pedal is applied and partially released while the vehicle is stopped and the brake pedal is applied.

6 Claims, 4 Drawing Sheets

(51) Int. Cl.
*F02D 41/08* (2006.01)
*F16H 61/00* (2006.01)
F02M 35/10 (2006.01)
F16H 61/20 (2006.01)
F02D 41/02 (2006.01)

(56) References Cited

U.S. PATENT DOCUMENTS

| | | | |
|---|---|---|---|
| 4,899,708 A | 2/1990 | Jung | |
| 5,332,056 A | 7/1994 | Niibe et al. | |
| 6,314,801 B1 * | 11/2001 | Reggiardo | F16H 61/20 73/112.01 |
| 6,542,804 B2 * | 4/2003 | Muratomi | F16H 61/20 477/116 |
| 7,080,724 B2 * | 7/2006 | Hasegawa | B60T 7/12 192/220 |
| 9,145,118 B2 | 9/2015 | Cunningham et al. | |
| 9,879,633 B2 | 1/2018 | Ferguson et al. | |
| 10,196,063 B2 * | 2/2019 | Zagorski | B60W 30/18109 |
| 2011/0054765 A1 | 3/2011 | Lewis et al. | |
| 2013/0057055 A1 | 3/2013 | Miyashita | |

FOREIGN PATENT DOCUMENTS

| | | |
|---|---|---|
| EP | 0990793 A2 | 4/2000 |
| GB | 2212863 A | 8/1989 |
| JP | 2005330844 A | 12/2005 |

* cited by examiner

SYSTEM AND METHOD FOR GENERATING VACUUM VIA AN ENGINE

CROSS REFERENCE TO RELATED APPLICATION

The present application is a divisional of U.S. patent application Ser. No. 14/559,042, entitled "SYSTEM AND METHOD FOR GENERATING VACUUM VIA AN ENGINE," filed on Dec. 3, 2014. The entire contents of the above-referenced application are hereby incorporated by reference in its entirety for all purposes.

BACKGROUND/SUMMARY

A small displacement engine may be boosted (e.g., pressurizing) to provide power output that is similar to a larger engine. The smaller engine may exhibit reduced pumping losses and reduced engine friction as compared to a larger engine. However, it may be more difficult for the smaller engine to produce a same amount of intake manifold vacuum as the larger engine when both the smaller engine and the larger engine are operating at a same speed and torque output. Further, the smaller engine may provide sufficient vacuum for vehicle vacuum systems during some conditions, but the same engine may not provide sufficient vacuum for vehicle vacuum systems during other conditions. Consequently, it may be desirable to provide a way for smaller displacement engines to provide sufficient levels of intake manifold vacuum during a broader range of engine operating conditions.

The inventors herein have recognized the above-mentioned issues and have developed a vehicle method, comprising: shifting a transmission from a gear to neutral via a controller in response to an actual total number of braking events being greater than a threshold.

By shifting a transmission coupled to an engine into neutral from a forward or reverse gear, load on the engine may be reduced so that engine intake manifold pressure may be reduced. The engine may provide additional vacuum to vehicle vacuum systems when intake manifold pressure is lower. For example, shifting the transmission into neutral may alleviate one particular condition where the smaller engine may have difficulty providing a desired amount of vacuum at higher altitudes. In particular, during a condition where a driver repeatedly applies and partially releases a brake pedal when a vehicle is stopped at a higher altitude, shifting the transmission into neutral may increase engine vacuum and reduce a possibility of hard brake pedal feel.

The present description may provide several advantages. Specifically, the approach may improve operation of a vehicle's vacuum operated systems. Additionally, the approach may not increase engine fuel consumption much of the time since the approach may only be applied during selected engine operating conditions that may not be frequently encountered. Further, the approach may improve driver satisfaction by reducing the possibility of hard brake pedal feel. Shifting the transmission to neutral results in a slightly delayed acceleration upon commanding vehicle acceleration with the accelerator pedal if the transmission engagement torque application is managed. Thus, neutral idle may be used to improve brake booster vacuum only during select conditions where vacuum production is desired to reduce the possibility of low vacuum conditions. This action may be applied at high altitude (low BP) and closely repeated brake pedal motion conditions. The method detects these conditions and commands neutral idle when they occur. Further, neutral idle is also commanded when brake booster vacuum is below a threshold.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
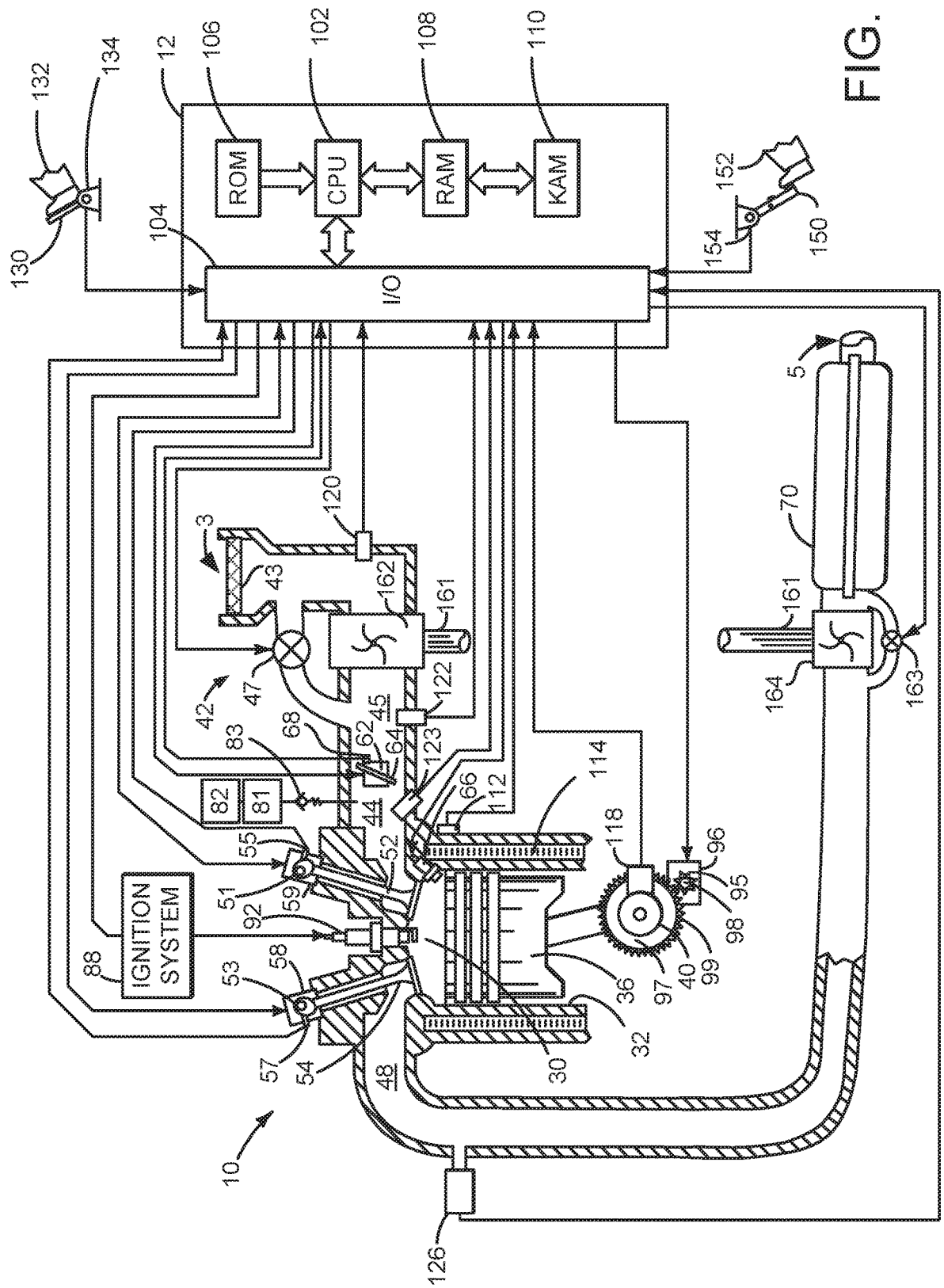
FIG. 1 shows a schematic depiction of an engine and vacuum system.
Figure 2:
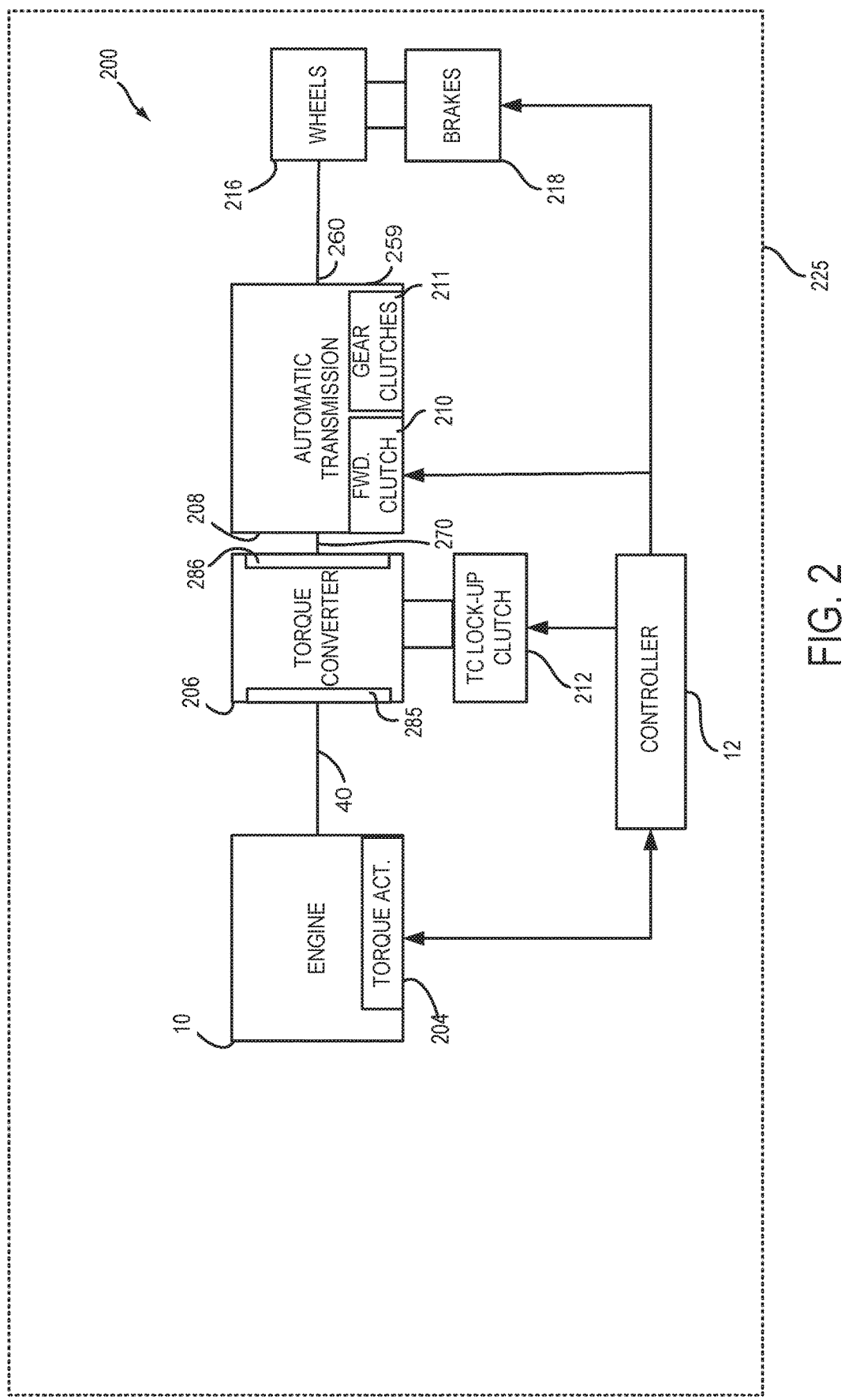
FIG. 2 shows a schematic depiction of an example vehicle driveline.

The present description is related to proving vacuum to a vehicle that includes an engine. The engine may be configured as is shown in FIG. 1. The engine of FIG. 1 may be incorporated into a vehicle driveline as shown in FIG. 2. The system of FIGS. 1 and 2 may include executable instructions to provide the method of FIG. 3. An engine may produce additional vacuum via shifting a transmission as is shown in the sequence of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 (e.g., low voltage (operated with less than 30 volts) electric machine) includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake valve 52 may be selectively activated and deactivated by valve activation device 59. Exhaust valve 54 may be selectively activated and deactivated by valve activation device 58.

Fuel injector 66 is shown positioned to inject fuel directly into cylinder 30, which is known to those skilled in the art as direct injection. Fuel injector 66 delivers liquid fuel in proportion to the pulse width from controller 12. Fuel is delivered to fuel injector 66 by a fuel system (not shown) including a fuel tank, fuel pump, and fuel rail (not shown). In one example, a high pressure, dual stage, fuel system may be used to generate higher fuel pressures.

In addition, intake manifold 44 is shown communicating with turbocharger compressor 162 and engine air intake 42. In other examples, compressor 162 may be a supercharger compressor. Shaft 161 mechanically couples turbocharger turbine 164 to turbocharger compressor 162. Optional electronic throttle 62 (e.g., central or engine intake manifold throttle) adjusts a position of throttle plate 64 to control air flow from compressor 162 to intake manifold 44. Pressure in boost chamber 45 may be referred to as throttle inlet pressure since the inlet of throttle 62 is within boost chamber 45. The throttle outlet is in intake manifold 44. In some examples, throttle 62 and throttle plate 64 may be positioned between intake valve 52 and intake manifold 44 such that throttle 62 is a port throttle. Compressor recirculation valve 47 may be selectively adjusted to a plurality of positions between fully open and fully closed. Waste gate 163 may be adjusted via controller 12 to allow exhaust gases to selectively bypass turbine 164 to control the speed of compressor 162.

Air filter 43 cleans air entering engine air intake 42 via inlet 3 which is exposed to ambient temperature and pressure. Converted combustion byproducts are exhausted at outlet 5 which is exposed to ambient temperature and pressure. Thus, piston 36 and combustion chamber 30 may operate as a pump when engine 10 rotates. Inlet 3 is upstream of outlet 5 according to a direction of flow through engine 10, exhaust manifold 48, and engine air intake 42. Upstream does not include anything outside the engine past the inlet, and downstream does not include anything outside the engine past the outlet.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Converter 70 can include multiple catalyst bricks, in one example. In another example, multiple emission control devices, each with multiple bricks, can be used. Converter 70 can be a three-way type catalyst in one example.

Engine 10 may provide vacuum to vacuum reservoir 81 via check valve 83. Air flows from vacuum reservoir 81 into intake manifold 44 when pressure in intake manifold is less than pressure in vacuum reservoir 81. Vacuum reservoir 81 provides vacuum to vacuum consumers 82. Vacuum consumers may include but are not limited to brake boosters, waste gate actuators, and air conditioning duct actuators.

Controller 12 is shown in FIG. 1 as a conventional microcomputer including: microprocessor unit 102, input/output ports 104, read-only memory 106 (e.g., non-transitory memory), random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a position sensor 154 coupled to brake pedal 150 for sensing force applied by foot 152, a measurement of engine manifold pressure (MAP) from pressure sensor 123 coupled to intake manifold 44; a measurement of engine boost pressure or throttle inlet pressure from pressure sensor 122; an engine position from a Hall effect sensor 118 sensing crankshaft 40 position; a measurement of air mass entering the engine from sensor 120; and a measurement of throttle position from sensor 68. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC).

During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion.

During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

Referring now to FIG. 2, FIG. 2 is a block diagram of a vehicle 225 including a driveline 200. The driveline of FIG. 2 includes engine 10 shown in FIG. 1. Driveline 200 may be powered by engine 10. Engine crankshaft 40 is shown coupled to torque converter 206. In particular, engine crankshaft 40 is mechanically coupled to torque converter impeller 285. Torque converter 206 also includes a turbine 286 to output torque to transmission input shaft 270. Transmission input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft 270 of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., reverse and gears 1-6) 211 and forward clutch 210. The gear clutches 211 (e.g., 1-10) and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal as shown in FIG. 1. In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

Controller 12 may be configured to receive inputs from engine 10, as shown in more detail in FIG. 1, and accordingly control a torque output of the engine and/or operation of the torque converter, transmission, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 12 may initiate engine shutdown by shutting off fuel and/or spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. When engine restart conditions are satisfied, and/or a vehicle operator wants to launch the vehicle, controller 12 may reactivate engine 10 by craning engine 10 and resuming cylinder combustion.

Thus, the system of FIGS. 1 and 2 provides for a vehicle system, comprising: an engine; a transmission coupled to the engine; and a controller including instructions stored in a non-transitory memory for shifting the transmission from a gear to neutral in response to a vehicle being stopped, a brake pedal being applied, and more than a predetermined actual total number of braking events before the brake pedal is fully released. The vehicle system includes where the number of braking events is based on an actual total number of times a brake pedal is applied and released. The vehicle system further comprises additional instructions to increase the engine idle speed in response to an actual total number of braking events. The vehicle system further comprises additional instructions to shift the transmission to the gear in response to the brake pedal being fully released. The vehicle system further comprises additional instructions to shift the transmission to the gear in response to an accelerator pedal being applied. The vehicle system includes where the gear is a forward gear or reverse.

Figure 3:
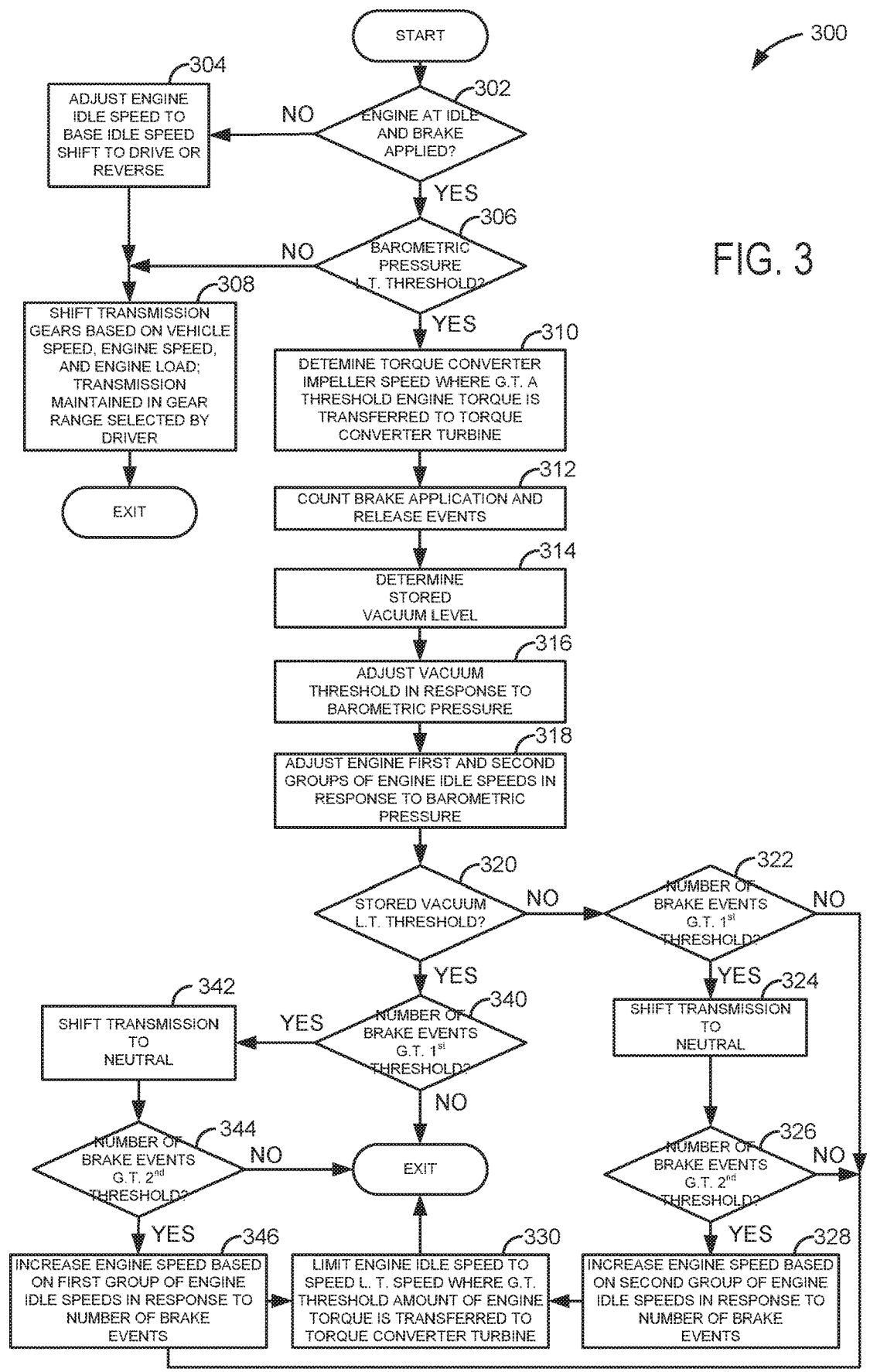
FIG. 3 shows a flowchart of an example method for improving vacuum generation for a vehicle having an engine.
Figure 4:
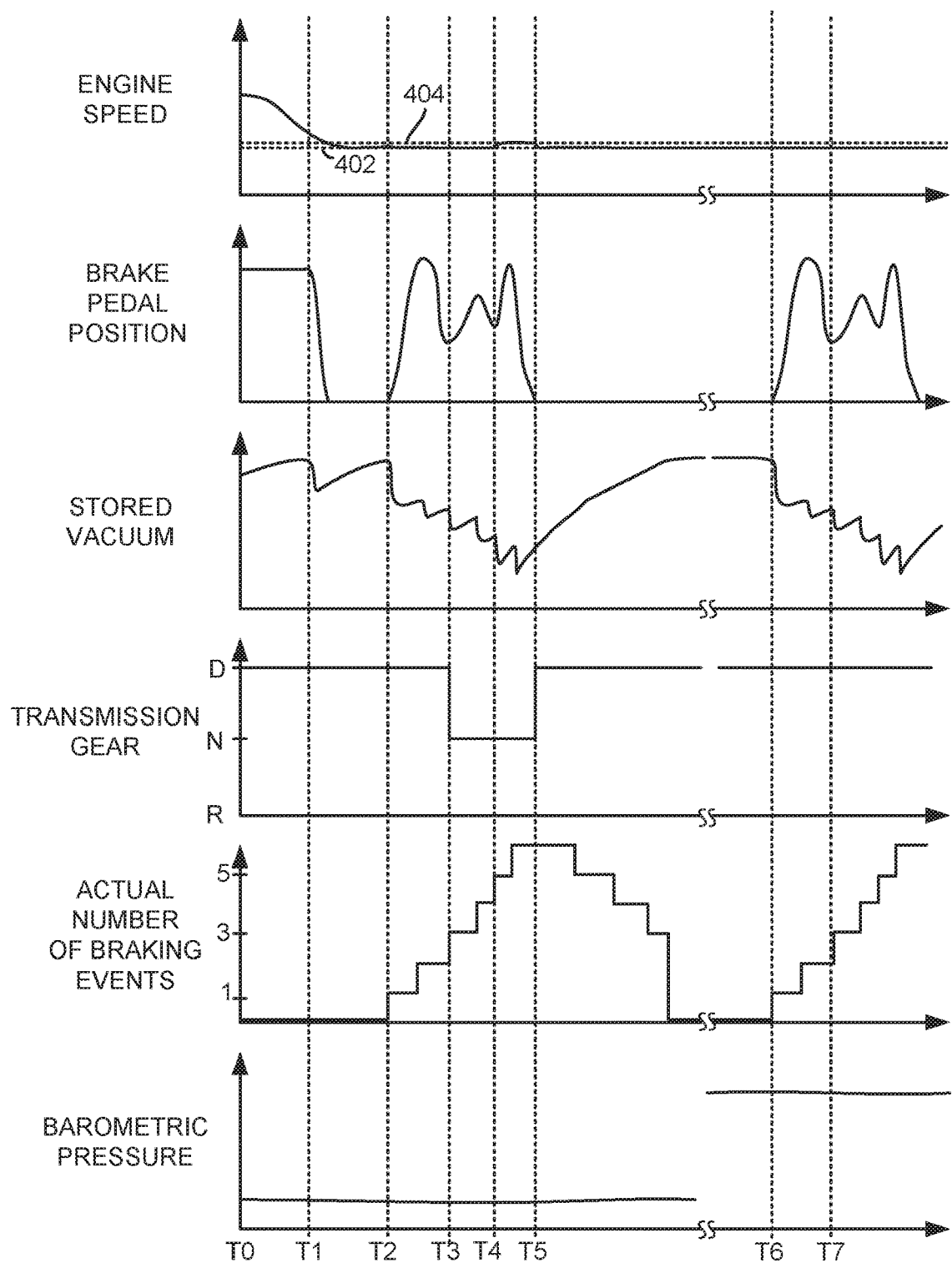
FIG. 4 shows an example vacuum generating sequence according to the method of FIG. 3.

Referring now to FIG. 3, a method for operating an engine is shown. The method of FIG. 3 may be incorporated into the system of FIGS. 1 and 2 as executable instructions stored in non-transitory memory. Further, the method of FIG. 3 may provide the operating sequence as is shown in FIG. 4.

The following method is applicable to vehicles that are in gear (i.e. not in park or neutral). At 302, method 300 judges whether or not the engine is at idle conditions and the vehicle brakes are at least partially applied. The engine may be at idle conditions when driver demand torque is substantially zero (e.g., less than three percent of full engine torque) and when the vehicle's speed is a creep speed or less. Creep speed may be defined as a speed a vehicle travels at when driver demand torque is zero after the vehicle moves after releasing vehicle brakes while vehicle speed is zero. The engine is not at idle conditions when the accelerator pedal is applied by a driver. The vehicle brakes may be determined to be at least partially applied when the brake pedal position is greater than a position the brake pedal assumes when the brake pedal is not applied. If method 300 judges that the engine is not at idle with brakes applied, the answer is no and method 300 proceeds to 304. Otherwise, the answer is yes and method 300 proceeds to 306.

At 304, method 300 adjusts desired engine idle speed to a base idle speed. A base idle speed may be a speed the engine rotates at when the engine is warm and when driver demand is zero for a period of time. For example, a base idle speed for an eight cylinder engine may be 600 RPM. Additionally, an offset speed may be added to the base idle speed for cold ambient temperatures and cold engine temperatures. The engine speed may be adjusted to a base idle speed via reducing an amount of fuel injected to the engine, retarding spark timing, and reducing the amount of air flowing through the engine. By retarding spark timing, peak cylinder pressure may be delayed during a cylinder cycle so that the engine produces less torque. Reducing the amount of injected fuel may reduce engine torque production since less chemical energy is available to the engine. The engine air amount may be reduced via at least partially closing the throttle. Thus, the desired engine idle speed may be adjusted to the base engine idle speed when the engine is not at idle. Consequently, if the engine returns to idle conditions, the engine may idle at the desired base engine idle speed.

Additionally, the transmission coupled to the engine is shifted to a gear based on a position of a gear selector if the transmission is in neutral. For example, if the transmission is in neutral to increase vacuum production and the gear selector switch is in D (drive), the transmission may be shifted into first gear. Likewise, if the transmission is in neutral and the gear selector is in R (reverse), the transmission is shifted into reverse. If any braking events were counted when the engine was at idle, the count is cleared when the engine is not at idle conditions. Method 300 proceeds to 308 after desired engine idle speed is adjusted to base engine idle speed and the transmission is shifted into a forward or reverse gear.

At 308, method 300 shifts transmission gears based on vehicle speed, engine speed, and engine load. For example, transmission gears may be selected as a function of vehicle speed, engine speed, and engine load. The transmission gears are automatically selected. If the vehicle is starting from stop, first gear is selected. Additionally, the transmission gears are in a range selected by the driver. For example, if the driver selects drive (D), the transmission may shift through gears 1-9. Method 300 proceeds to exit after the transmission gears are automatically selected.

At 306, method 300 judges whether or not barometric pressure is less than a threshold pressure. Barometric pressure may be used as a surrogate for altitude. The engine may not be capable of providing a desired amount of vacuum when the engine is operated at higher than a threshold altitude or lower than a threshold barometric pressure. If method 300 judges that the engine is operating at barometric pressure less than a threshold pressure, the answer is yes and method 300 proceeds to 310. Otherwise, the answer is no and method 300 proceeds to 308.

At 310, method 300 determines a torque converter impeller speed where greater than (G.T.) a threshold percentage of engine torque is transferred to the torque converter turbine. Alternatively, method 300 may determine a threshold torque converter impeller speed where greater than a threshold amount of engine torque is transferred to the torque converter turbine or the transmission input shaft. In one example, a torque converter transfer function outputs a torque converter torque multiplier that is based on a difference in torque converter impeller speed and torque converter turbine speed. Thus, the torque converter impeller speed where greater than a threshold percentage of engine torque is transferred to the transmission may be determined by indexing the torque converter transfer function with the threshold percentage of torque transferred expressed as a torque converter torque multiplier and torque converter turbine speed. On the other hand, the torque converter impeller speed where greater than a threshold amount of engine torque may be transferred to the torque converter turbine may be determined via multiplying present engine torque (e.g., based on engine speed and load) by torque converter torque multipliers in the transfer function that are available at the present torque converter turbine speed and a range of torque converter impeller speeds. Method 300 proceeds to 312 after the torque converter impeller speed where more than a threshold amount of torque is transferred by the torque converter.

At 312, method 300 counts an actual total number of vehicle brake application and release events. A brake application event may be defined as an increase in brake pedal application distance (e.g., increasing an amount of braking requested) from conditions when the brake pedal was stopped at a position for more than a threshold amount of time or an increase in brake pedal application distance from a condition when the brake pedal was being released. A brake release event may be defined as a decrease in brake pedal application distance (e.g., decreasing an amount of braking requested) from conditions when the brake pedal was stopped at a position for more than a threshold amount of time or a decrease in brake pedal application distance from a condition when the brake pedal was being applied. For example, if a brake pedal is applied a first distance, stopped, and then applied a second distance and stopped, two braking events have occurred. Further, if the brake pedal is applied and released without stopping, two braking events have occurred (e.g., the application and the release).

In some examples, a braking event is not counted if a braking event prior to a present braking event occurred more than a threshold time ago. For example, if a first braking event occurs at time T0 and a second braking event occurs at time T1, time T1 later than time T0 by greater than the threshold amount of time, only one braking event is counted (e.g., the braking event at time T1). Further, the number of braking events may be reduced by a value of one every threshold number of seconds unless braking events continue to occur within a predetermined time interval (e.g., every 15 seconds). Further still, the number of braking events may be adjusted to a value of zero when the engine is not idling. Thus, braking events may have to occur with a predetermined frequency for the actual number of braking events to continue increasing, and the actual number of braking events may decrease over time if braking events do not occur at a predetermined frequency. Method 300 proceeds to 314 after the number of brake events begin to be counted.

At 314, method 300 determines an amount of stored vacuum. In one example, method 300 determines an amount of vacuum in a vacuum reservoir or a brake booster by measuring pressure in the brake booster or the vacuum reservoir. Method 300 proceeds to 316 after the amount of stored vacuum is determined.

At 316, method 300 adjusts a threshold vacuum level for the vacuum reservoir or the brake booster based on barometric pressure. The threshold vacuum level may be empirically determined and stored to controller memory. For example, if a threshold vacuum is 30 kPa below barometric pressure at sea level, the threshold vacuum may be reduced to 25 kPa at a higher altitude. By adjusting the threshold vacuum level for barometric pressure, the transmission may be shifted to neutral or engine speed may be increased sooner in time in response to decreasing stored vacuum so that additional vacuum may be provided via the engine intake manifold. In one example, the threshold vacuum level is decreased in response to a decrease in barometric pressure. The threshold vacuum level is increased in response to an increase in barometric pressure. Method 300 proceeds to 318 after the threshold level of stored vacuum is adjusted for barometric pressure.

At 316, method 300 adjusts first and second groups of engine idle speeds in response to barometric pressure. In one example, a first group of engine idle speeds is provided for an actual number of braking events when a stored amount of vacuum is less than a threshold vacuum. For example, if stored vacuum is less than the threshold vacuum and the number of braking events is two, the desired engine idle speed may be adjusted to 700 RPM. If stored vacuum is less than the threshold vacuum and the number of braking events is four, the desired engine idle speed may be adjusted to 750 RPM. The second group of engine idle speeds is provided for an actual number of braking events when a stored amount of vacuum is greater than the threshold vacuum. For example, if stored vacuum is greater than the threshold vacuum and the number of braking events is two, the desired engine idle speed may be adjusted to 650 RPM. If stored vacuum is great than the threshold vacuum and the number of braking events is four, the desired engine idle speed may be adjusted to 700 RPM. Method 300 proceeds to 316 after the engine idle speeds in the groups are adjusted.

At 320, method 300 judges if the stored vacuum level is less than the threshold vacuum determined and adjusted at 316. In one example, method 300 compares the threshold vacuum determined at 316 to a pressure in a vacuum reservoir or the brake booster. If the stored vacuum level is less than the threshold vacuum, the answer is yes and method 300 proceeds to 340. Otherwise, the answer is no and method 300 proceeds to 322.

At 322, method 300 judges if an actual total number of braking events is greater than (G.T.) a first threshold number of events. In one example, the number is two so that one brake application and release may be tolerated without shifting the transmission into neutral to generate additional vacuum production (e.g., a higher flow rate of air out of the vacuum reservoir). However, any integer number may be the threshold actual number of braking events. If the actual total number of braking events has been exceeded, the answer is yes and method 300 proceeds to 324. Otherwise, the answer is no and method 300 proceeds to exit.

At 324, method 300 shifts the transmission from a drive gear or reverse into neutral. The transmission may be shifted into neutral via releasing a gear clutch. By shifting into neutral, engine load may be reduced so that engine intake manifold pressure may decrease. Method 300 proceeds to 326 after the transmission is shifted into neutral. If the transmission is already in neutral, method 300 proceeds to 326.

At 326, method 300 judges if an actual total number of braking events is greater than (G.T.) a second threshold number of events. In one example, the number is four so that the transmission is shifted to neutral before the engine idle speed is increased. However, any integer number may be the second threshold actual number of braking events. If the second actual total number of braking events has been exceeded, the answer is yes and method 300 proceeds to 328. Otherwise, the answer is no and method 300 proceeds to exit.

At 328, method 300 increases engine speed based on the second group of desired engine idle speed values in response to the number of braking events. For example, if the second group of desired engine idle speeds includes values of 750 RPM for two braking events, 800 RPM for four braking events, and 825 RPM for six braking events, the desired engine speed is adjusted to 800 RPM if the actual number of braking events is four. The engine idle speed is increased to 800 RPM via increasing fuel and air supplied to the engine cylinders and/or advancing spark timing. Conversely, the desired engine idle speed may be decreased via reducing an amount of fuel injected, air inducted, and retarding spark timing. Method 300 proceeds to 330 after the engine idle speed is adjusted.

At 330, method 300 limits engine idle speed to a speed less than a speed where greater than (G.T.) a threshold amount of engine torque is transferred to the torque converter turbine. For example, if it is determined that more than a threshold amount of engine torque is transferred to a torque converter turbine at 850 RPM at 310, engine idle speed is limited to less than 850 RPM. Alternatively, method 300 limits engine idle speed to a speed less than a speed where greater than a threshold percentage of engine torque is transferred to the torque converter turbine. Method 300 exits after engine idle speed is limited.

At 340, method 300 judges if an actual total number of braking events is greater than (G.T.) a first threshold number of events. In one example, the number is two so that one brake application and release may be tolerated without shifting the transmission into neutral to generate additional vacuum production (e.g., a higher flow rate of air out of the vacuum reservoir). However, any integer number may be the threshold actual number of braking events. If the actual total number of braking events has been exceeded, the answer is yes and method 300 proceeds to 342. Otherwise, the answer is no and method 300 proceeds to exit.

At 342, method 300 shifts the transmission from a drive gear or reverse into neutral. The transmission may be shifted into neutral via releasing a gear clutch. By shifting into neutral, engine load may be reduced so that engine intake manifold pressure may decrease. Method 300 proceeds to 344 after the transmission is shifted into neutral. If the transmission is already in neutral, method 300 proceeds to 344.

At 344, method 300 judges if an actual total number of braking events is greater than (G.T.) a second threshold number of events. In one example, the number is four so that the transmission is shifted to neutral before the engine idle speed is increased. However, any integer number may be the second threshold actual number of braking events. If the second actual total number of braking events has been exceeded, the answer is yes and method 300 proceeds to 346. Otherwise, the answer is no and method 300 proceeds to exit.

At 346, method 300 increases engine speed based on the first group of desired engine idle speed values in response to the number of braking events. For example, if the first group of desired engine idle speeds includes values of 650 RPM for two braking events, 700 RPM for four braking events, and 750 RPM for six braking events, the desired engine speed is adjusted to 750 RPM if the actual number of braking events is six. The engine idle speed is increased to 750 RPM via increasing fuel supplied to the engine cylinders and/or advancing fuel injection timing. Method 300 proceeds to 330 after the engine idle speed is adjusted.

It should also be noted that the engine idle speed may be reduced to a base idle speed and the transmission may be shifted from neutral to a gear in response to application of an accelerator pedal any time after method 300 is in steps 310-346.

In this way, a transmission may be shifted into neutral and engine idle speed may be increased in response to an actual number of braking events while an engine is operating in a vehicle at idle conditions where vehicle brakes are applied. The number of braking events may be indicative of vacuum use such that engine vacuum production may be increased before less than a threshold amount of stored vacuum is present in a reservoir. In this way, vacuum production may be increased before the stored vacuum amount is less than a threshold so that operation of vacuum consumers may be maintained. Further, in some examples, method 300 may only shift into neutral only when the brake pedal is being applied. Thus, method 300 may not shift to neutral when a brake pedal is fully or partially released. Additionally, in some examples, an amount of consumed vacuum may be determined from the number of brake applications and the distance the brake pedal was stroked. Consequently, the transmission may be shifted into neutral in response to an amount of consumed vacuum as estimated from brake pedal stroke and number of brake pedal applications.

Thus, the method of FIG. 3 provides for a vehicle method, comprising: shifting a transmission from a gear to neutral via a controller in response to an actual total number of braking events being greater than a threshold. The method includes where shifting the transmission from a gear to neutral is performed in further response to barometric pressure being less than a threshold pressure. The method includes where the shifting the transmission in response to the actual total number of braking events being greater than a threshold only occurs when a vehicle in which the transmission operates is at zero speed and a driver is applying vehicle brakes. The method further comprises shifting the transmission from neutral to the gear in response to release of a brake pedal. The method further comprises shifting the transmission from neutral to the gear in response to application of an accelerator pedal.

In some examples, the method includes where the number of braking events is based on an actual total number of decreases in brake pedal application distance. The includes where shifting the transmission from a gear to neutral is performed in further response to an amount of stored vacuum being less than a threshold.

The method of FIG. 3 also provides for a vehicle method, comprising: shifting a transmission from a gear to neutral via a controller in response to an actual total number of braking events being greater than a first threshold; and increasing an engine idle speed in response to the actual total number of braking events being greater than a second threshold. The method includes where second threshold is greater than the first threshold. The method includes where shifting the transmission from a gear to neutral is performed in further response to barometric pressure being less than a threshold pressure. The method includes where shifting the transmission from a gear to neutral is performed in further response to an amount of stored vacuum being less than a threshold.

In some examples, the further comprises shifting the transmission from neutral to the gear in response to applying an accelerator pedal. The method further comprises decreasing the engine idle speed in response to releasing a brake pedal. The method further comprises inducting less than a threshold amount of air into an engine while the transmission is in neutral.

Referring now to FIG. 4, an example vehicle braking sequence where engine speed and transmission operating state are adjusted to increase engine vacuum production via the engine's intake manifold or an ejector is shown. The signals and sequences of FIG. 4 may be provided by the system shown in FIGS. 1 and 2 executing the method of FIG. 3. Vertical markers T0-T7 represent times of interest in the sequence. In this example, vacuum is provided via engine manifold vacuum as is shown in FIG. 1, but in other examples, vacuum may be provided via an ejector or vacuum pump. The X axes of each plot include SS to indicate a brake in time. During the brake in time the vehicle may be operated.

The first plot from the top of FIG. 4 represents engine speed versus time. The X represents time and time increases from the left side of the plot to the right side of the plot. The Y axis represents engine speed and engine speed increases in the direction of the Y axis arrow. Horizontal line 402 represents a base engine idle speed. Horizontal line 404 represents a first engine idle speed adjusted for three vehicle braking events.

The second plot from the top of FIG. 4 represents vehicle brake pedal position versus time. The brake pedal application distance increases in the direction of the Y axis arrow. The X represents time and time increases from the left side of the plot to the right side of the plot.

The third plot from the top of FIG. 4 represents an amount of stored vacuum versus time. The Y axis represents an amount of stored vacuum and the amount of stored vacuum increases in the direction of the Y axis arrow. The X axis represents time and time increases from the left to the right side of the figure. The fourth plot from the top of FIG. 4 represents transmission gear versus time. The Y axis represents transmission gear. D represents drive with forward gears 1-N, N is neutral (e.g., no gear selected and no torque is delivered to vehicle wheels via the transmission), and R represents reverse gear. The X axis represents time and time increases from the left to the right side of the figure.

The fifth plot from the top of FIG. 4 represents an actual total number of vehicle braking events versus time. The Y axis represents actual total number of vehicle braking events and the actual total number of vehicle braking events increases in the direction of the Y axis arrow. The X axis represents time and time increases from the left to the right side of the figure.

The sixth plot from the top of FIG. 4 represents barometric pressure versus time. The Y axis represents barometric pressure and barometric pressure increases in the direction of the Y axis arrow. Higher barometric pressures indicate lower altitude. The X axis represents time and time increases from the left to the right side of the figure.

At time T0, the engine speed is decreasing and the brake pedal is applied. The transmission is in drive. The amount of stored vacuum is increasing since the brake pedal position is constant. The accelerator is not applied and the actual number of braking events is zero since the engine is not at idle. These conditions may be indicative of decelerating a vehicle. The barometric pressure is low indicating that the engine and vehicle are operating above sea level.

At time T1, the brake pedal is released and the engine speed continues to decline to the base idle speed. The amount of stored vacuum decreases as the master cylinder consumes vacuum in response to releasing the brake pedal. The transmission is in drive and the barometric pressure is low.

Between time T1 and time T2, the engine speed reaches the base idle speed and the vehicle brakes are not applied. The vehicle may move at a creep speed based on the amount of engine torque produced at idle.

At time T2, the driver applies the brake pedal and increases the brake pedal position while the engine is idling. The amount of stored vacuum is decreased in response to the driver applying the brake pedal and the actual number of braking events increases to a value of one. The transmission remains in drive and the barometric pressure remains constant.

Between time T2 and time T3, the driver partially releases the brake pedal and the amount of stored vacuum decreases. The amount of stored vacuum increases between brake release and apply events as the engine rotates and increases vacuum in the intake manifold (not shown).

At time T3, the driver applies the brake pedal increasing the brake pedal position a second time while the engine is at idle speed. The amount of stored vacuum is decreased in response to the brake application and the number of braking events increases to a value of three. The transmission is shifted from drive to neutral to increase vacuum production by the engine. Thus, the transmission was not shifted for the first two braking events, but the transmission was shifted to neutral for the third braking event. The barometric pressure remains constant.

Between time T3 and time T4, the driver releases the brake pedal and the amount of stored vacuum decreases. The number of braking events also increases by one to a value of four.

At time T4, the brake pedal is applied a third time while the engine is at idle speed. The amount of stored vacuum continues to decrease in response to the brake application and the number of braking events is increased to five. The engine idle speed is increased a first time to the level of 404 in response to the number of braking events reaching a value of five. The barometric pressure remains constant.

At time T5, the brake pedal is fully released. The transmission is shifted from neutral to drive in response to the brake pedal being fully released. In other examples, the transmission may be shifted in response to the brake pedal being within a threshold distance of being fully released. The engine remains at idle and the barometric pressure remains constant.

Between time T5 and time T6, the amount of stored vacuum increases after the brake pedal is fully released since vacuum is not being consumed. The actual number of braking events reaches a value of five and then decrements downward in response to the brake pedal not being applied. The actual number of braking events is adjusted to zero in response to the stored amount of vacuum reaching a threshold level. In alternative examples, the number of actual braking events may countdown to zero before a threshold vacuum level is reached. The engine idle speed is reduced to the base idle speed in response to the actual number of braking events being reduced. In other examples, the engine idle speed may be reduced in response to an amount of time since a last braking event is greater than a threshold amount of time.

At time T6, the driver applies the brake pedal and increases the brake pedal position while the engine is idling. The amount of stored vacuum is decreased in response to the driver applying the brake pedal and the actual number of braking events increases to a value of one. The transmission remains in drive and the barometric pressure remains constant at a higher level than at time T2, thereby indicating that the engine is being operated near sea level.

Between time T6 and time T7, the driver partially releases the brake pedal and the amount of stored vacuum decreases. The amount of stored vacuum increases between brake release and apply events as the engine rotates and increases vacuum in the intake manifold (not shown).

At time T7, the driver applies the brake pedal increasing the brake pedal position a second time while the engine is at idle speed. The amount of stored vacuum is decreased in response to the brake application and the number of braking events increases to a value of three. The transmission is not shifted from drive to neutral to increase vacuum production by the engine because the engine is operating at a lower altitude where the engine may provide sufficient vacuum.

Thus, the sequence after time T2 and before time T4 is identical to the sequence after time T6 to just after time T7. Nevertheless, the transmission is shifted at time T3 and not shifted after time T7 in conditions that are otherwise the same. In this way, vacuum generation via the engine may be contingent upon barometric pressure and/or vehicle altitude.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A vehicle system, comprising:
an engine;
a transmission coupled to the engine; and
a controller including instructions stored in a non-transitory memory for shifting the transmission from a gear to neutral in response to a vehicle being stopped, a brake pedal being applied, and more than a predetermined actual total number of braking events before the brake pedal is fully released.

2. The vehicle system of claim 1, where the predetermined actual total number of braking events is based on an actual total number of times a brake pedal is applied and released.

3. The vehicle system of claim 1, further comprising additional instructions to increase an engine idle speed in response to an actual total number of braking events.

4. The vehicle system of claim 1, further comprising additional instructions to shift the transmission to the gear in response to the brake pedal being fully released.

5. The vehicle system of claim 1, further comprising additional instructions to shift the transmission to the gear in response to an accelerator pedal being applied.

6. The vehicle system of claim 1, where the gear is a forward gear or reverse.

* * * * *